UNITED STATES PATENT OFFICE 1,973,732

CEMENT

Foster Dee Snell, Brooklyn, N. Y.

No Drawing. Application January 9, 1932,
Serial No. 585,805

6 Claims. (Cl. 106—30)

The present invention has for an object to provide an improved cement.

The invention has been developed in connection with the production of an acid proof cement of a type suitable for use in the construction of masonry that must withstand exposure to acid or acid fumes, and, for convenience of disclosure such an embodiment of the invention will be described to illustrate the principles involved, but it will be understood that the particular description is not intended as defining the limits of the invention and that the principles of the invention can be extended to the production of cements of other character and useful for other purposes.

Cements of this type as previously used have consisted of a powder of acid resisting material such as ground stoneware or other suitable aggregate and sodium silicate solution with which it was mixed just prior to use. Cements have also been sold in liquid or plastic form consisting of an aggregate or grog mixed with a sodium silicate solution and stored in air-tight containers.

One of the objects of the present invention is to provide cement which may be produced and supplied in powdered form having such ingredients that it may be mixed with water for use in the same way as ordinary cement.

Another object is to provide a cement of this character which will be acid proof when set.

Another object is to provide a cement of this character which will be resistant to water.

I have found that a mixture of ground stoneware or other grog with a soluble powdered sodium silicate will set when mixed with water but only partially and after a considerable length of time. If, however, a material is present in the mixture which, on solution in water, will neutralize part or all of the sodium oxide or the sodium silicate, complete setting will occur in a much shorter period of time. I have found sodium fluo-silicate effective for this purpose. The presence in the mixture of enough sodium fluo-silicate to neutralize from 50% to 100% of the sodium oxide of the silicate will give a satisfactory set. Complete neutralization is advantageous, however, since in that case a cement is produced which is resistant to the dissolving action of water, as well as resistant to acid. This is improved in practical use by having excess sodium fluo-silicate present.

A satisfactory dry acid-proof cement may be made in accordance with the formula:—

|  | Parts |
| --- | --- |
| Aggregate | 100 |
| Sodium silicate | 20 to 30 |
| Sodium fluo-silicate | 10 to 25 |

An optimum composition probably approximates:—

|  | Parts |
| --- | --- |
| Aggregate | 100 |
| Sodium silicate | 25 |
| Sodium fluo-silicate | 23 |

The sodium silicate preferably used is that known as "G. C. Brand silicate". It is a solid silicate containing 27.5% sodium oxide and 55% silicon dioxide. It therefore has the ratio of 1:2. The balance of 17.5% is substantially all water.

The method of manufacture consists simply of suitably grinding and then thoroughly mixing the ingredients. For use the dry powder should be thoroughly mixed with sufficient water to insure solution of the soluble ingredients. It is advantageous to use water at a temperature of about 90° F. to obtain better solution of the dry materials.

In the above formula if the sodium silicate is one having a ratio of 1 part sodium oxide to 2 parts silicon dioxide then 100% of the sodium oxide will be neutralized when the dry cement is suitably mixed with water and some excess sodium fluo-silicate will be present.

The cement produced as above indicated remains workable for approximately an hour after mixing with water and yet it will set completely within 24 hours.

Tests on two inch cubes of material made in accordance with this formula and aged for three weeks have shown an average crushing strength of fifteen hunderd pounds per square inch, and dumb-bell pieces of one inch sectional area after similar aging showed a tensile strength of 385 pounds.

The contraction of the two inch cubes appears to be less than 1/64 of an inch on a side during the first 24 to 48 hours.

It is a feature of this cement that it is water proof especially if an excess amount of sodium fluo-silicate is used. Any reduction in the amount of sodium fluo-silicate will cause a slight disintegration of the final product in cold water. This cement has the advantage that it is not necessary to paint the cement with sulphuric acid previous to use of the equipment.

In order to determine the resistance to acids and water, cubes of the cement were immersed in concentrated sulphuric, concentrated hydrochloric, concentrated acetic and concentrated nitric acids and in water. Each was brought to a boiling point once each day for six days. At the end of that time the cubes were washed thoroughly and again dried to constant weight in vacuo. The losses of weight caused by these reagents were as follows:—

Concentrated sulphuric acid____ Gain in weight
Concentrated hydrochloric acid_____ 4.89%
Concentrated acetic acid_____ 3.88%
Concentrated nitric acid_____ 3.54%
Water_____ 6.91%

These losses in weight correspond to minor amounts of soluble ingredients present in the original cement. There was no further loss in weight with additional treatment. Similarly cubes were tested to determine the effect of weak alkali and the loss after six days with heating to boiling once each day was found to be on the average 5.39%.

Certain advantages may be obtained if acid fluoride is substituted for a portion of the sodium fluo-silicate. The substitution may be for example, of the proportion of 17 pounds of sodium fluo-silicate and four pounds of sodium acid fluoride to replace 23 to 28 pounds of sodium fluo-silicate. It will be noted that the sodium fluo-silicate is reduced by more than the weight of the acid fluoride added.

A satisfactory dry acid proof cement containing acid fluoride may be made in accordance with the formula:

| | Parts |
|---|---|
| Aggregate | 100 |
| Sodium silicate | 20 to 30 |
| Sodium fluo-silicate | 10 to 20 |
| Sodium acid fluoride | 1 to 7 |

An optimum composition probably approximates:

| | Parts |
|---|---|
| Aggregate | 100 |
| Sodium silicate | 25 |
| Sodium fluo-silicate | 19 |
| Sodium acid fluoride | 5 |

The ingredients should be ground fine and thoroughly mixed. It is found convenient and effective to grind together the fluo-silicate and the acid fluoride with a portion of the aggregate of approximately equivalent weight.

It will be understood that the foregoing description of a particular embodiment of the invention developed for use as an acid proof cement is illustrative merely and variations in the composition may be developed when the cement is to be applied to other uses such for example as a binder for abrasive wheels or for artificial limestone or patching material for cement floors without departing from the spirit of the invention as defined in the claims.

I claim:

1. An acid proof cement comprising a combination in substantially the proportions indicated:

| | Parts |
|---|---|
| Aggregate | 100 |
| Sodium silicate (1:2 ratio) | 25 |
| Sodium fluo-silicate | 23 | said materials reacting when mixed with water to provide a workable cement which acts to form an acid proof and water proof product substantially as described.

2. An acid proof cement comprising a combination in substantially the proportions indicated:

| | Parts |
|---|---|
| Aggregate | 100 |
| Sodium silicate | 25 |
| Sodium fluo-silicate | 19 |
| Sodium acid fluoride | 5 |

3. A cement composition capable of setting to an acid proof and water proof product comprising a dry mixture of ground aggregate, a readily soluble powdered sodium silicate and sodium fluo-silicate in a proportion which completely neutralizes the sodium oxide of the silicate, said silicate mixture being completely soluble in water and capable of being applied before setting commences.

4. A cement comprising a dry mixture of ground aggregate powdered sodium silicate of $Na_2O:SiO_2$ ratio of 1 to 2, and sodium fluosilicate in a proportion which completely neutralizes the sodium oxide of the silicate, said mixture being capable of setting to an acid proof and water proof product.

5. A dry cement composition comprising ground aggregate, powdered sodium silicate, powdered sodium fluo-silicate and a small amount of sodium acid fluoride.

6. A dry finely ground cement composition comprising aggregate, sodium silicate of $Na_2O:SiO_2$ ratio of 1 to 2, sodium fluosilicate and a small quantity of sodium acid fluoride.

FOSTER DEE SNELL.